United States Patent
Travers

(10) Patent No.: US 12,017,133 B2
(45) Date of Patent: *Jun. 25, 2024

(54) SWIM AR GOGGLES

(71) Applicant: Vuzix Corporation, West Henrietta, NY (US)

(72) Inventor: Craig R. Travers, Honeoye Falls, NY (US)

(73) Assignee: Vuzix Corporation, West Henrietta, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/121,669

(22) Filed: Mar. 15, 2023

(65) Prior Publication Data

US 2023/0218976 A1 Jul. 13, 2023

Related U.S. Application Data

(63) Continuation of application No. 16/641,607, filed as application No. PCT/US2018/047735 on Aug. 23, 2018, now Pat. No. 11,607,600.

(Continued)

(51) Int. Cl.
*A63B 71/06* (2006.01)
*A63B 33/00* (2006.01)
(Continued)

(52) U.S. Cl.
CPC ........ *A63B 71/0622* (2013.01); *A63B 33/004* (2020.08); *G02B 27/0101* (2013.01);
(Continued)

(58) Field of Classification Search
CPC .............. A63B 71/0622; A63B 33/004; A63B 2071/0638; A63B 2220/12;
(Continued)

(56) References Cited

U.S. PATENT DOCUMENTS 9,798,144 B2* 10/2017 Sako .................. G06F 3/013
2003/0115010 A1* 6/2003 Estep .................. B63C 11/12
702/127

(Continued)

FOREIGN PATENT DOCUMENTS

DE 102013022325 A1 4/2015
EP 3535759 A1 9/2019
(Continued)

OTHER PUBLICATIONS

European Patent Office, Extended European Search Report in European patent application No. 18848119.6, dated Mar. 25, 2021.
(Continued)

*Primary Examiner* — Pierre E Elisca
(74) *Attorney, Agent, or Firm* — Harter Secrest & Emery LLP; Jacob D. Merrill, Esq.

(57) ABSTRACT

Swimming goggles including an eye covering having a transparent window defining a field of view, the eye covering having a seal extending from the transparent window operable to seal against a wearer's face and exclude water, a flexible strap comprising a temple region connected to the eye covering, a near-eye display operable to form virtual images viewable by one of the wearer's eyes, wherein the near-eye display comprises an image generator operable to generate images, and a computational processing unit arranged in signal communication with the image generator, wherein the computational processing unit is operable to transmit virtual image data to the image generator. Wherein the near-eye display includes a rigid frame connected to the temple region.

22 Claims, 16 Drawing Sheets

Related U.S. Application Data

(60) Provisional application No. 62/549,877, filed on Aug. 24, 2017.

(51) Int. Cl.
  G02B 27/01      (2006.01)
  H04N 23/53      (2023.01)

(52) U.S. Cl.
  CPC ....... *G02B 27/017* (2013.01); *G02B 27/0172* (2013.01); *H04N 23/531* (2023.01); *A63B 2071/0638* (2013.01); *A63B 2220/12* (2013.01); *A63B 2220/20* (2013.01); *A63B 2220/803* (2013.01); *A63B 2220/806* (2013.01); *A63B 2220/807* (2013.01); *A63B 2220/833* (2013.01); *A63B 2225/20* (2013.01); *A63B 2225/50* (2013.01); *A63B 2225/60* (2013.01); *A63B 2244/20* (2013.01); *G02B 2027/0138* (2013.01); *G02B 2027/014* (2013.01); *G02B 2027/0141* (2013.01); *G02B 2027/0185* (2013.01)

(58) Field of Classification Search
  CPC .......... A63B 2220/20; A63B 2220/803; A63B 2220/807; A63B 2220/833; A63B 2225/20; A63B 2225/50; G02B 27/0101; G02B 27/017; G02B 27/0172; H04N 23/531
  USPC .................................................... 348/333.08
  See application file for complete search history.

(56) References Cited

U.S. PATENT DOCUMENTS

| | | | |
|---|---|---|---|
| 2014/0362113 A1 | 12/2014 | Benson et al. | |
| 2015/0253573 A1* | 9/2015 | Sako | H04N 13/398 345/207 |
| 2016/0049108 A1* | 2/2016 | Yajima | A63F 13/5255 345/212 |
| 2016/0054569 A1* | 2/2016 | Lewis | H04L 1/00 351/158 |
| 2017/0146644 A1* | 5/2017 | Tucker | G02B 27/0172 |
| 2017/0168566 A1* | 6/2017 | Osterhout | G02B 27/017 |
| 2017/0178524 A1 | 6/2017 | Firmin | |
| 2018/0003983 A1* | 1/2018 | Sako | H04N 13/344 |
| 2019/0369836 A1* | 12/2019 | Faulkner | G06F 3/04845 |
| 2021/0154558 A1 | 5/2021 | Travers | |

FOREIGN PATENT DOCUMENTS

| | | |
|---|---|---|
| GB | 2283333 A | 5/1995 |
| WO | 2013049248 A2 | 4/2013 |

OTHER PUBLICATIONS

United States Patent & Trademark Office (ISA/US), International Search Report in International patent application No. PCT/US2018/047735, dated Oct. 24, 2018.

* cited by examiner

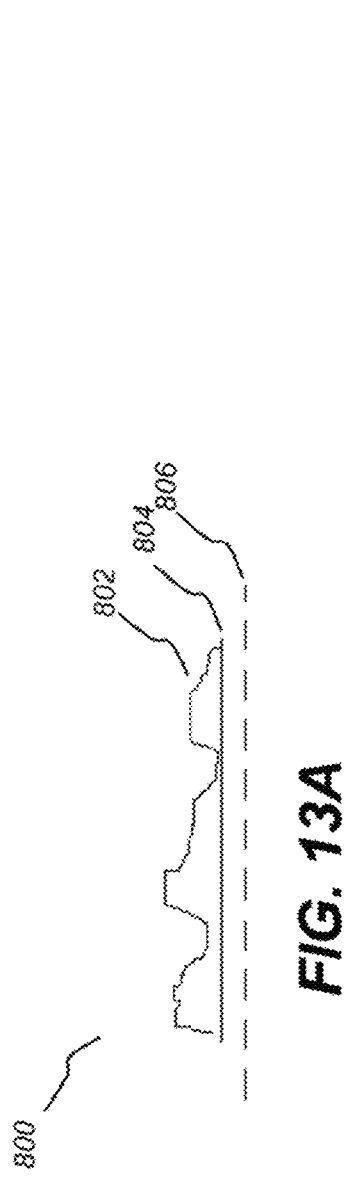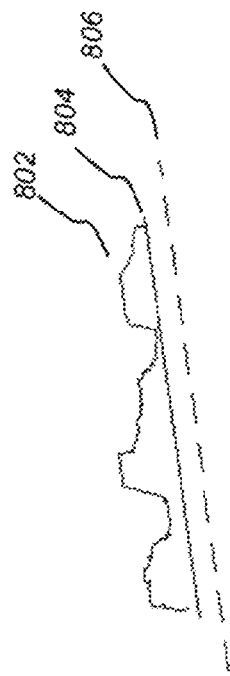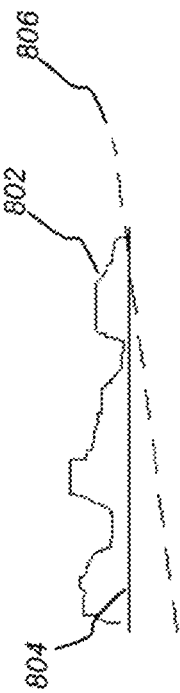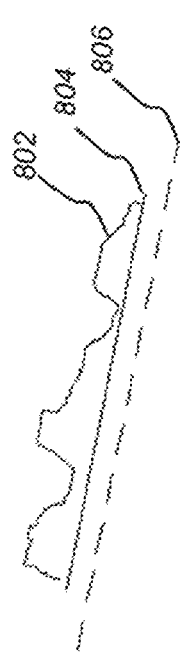

SWIM AR GOGGLES

CROSS-REFERENCE TO RELATED APPLICATIONS

This patent application is a continuation, and claims the priority benefit, of U.S. patent application Ser. No. 16/641,607, filed Feb. 24, 2020 entitled "SWIM AR GOGGLES", which is a U.S. national phase application under 35 U.S.C. § 371 of International Patent Application No. PCT/US2018/047735, filed Aug. 23, 2018, entitled "SWIM AR GOGGLES", which claims the priority benefit of U.S. Provisional Patent Application No. 62/549,877, filed Aug. 24, 2017, entitled "SWIM AR GOGGLES", each of which is incorporated herein by reference in its entirety for all purposes.

TECHNICAL FIELD

This invention generally relates to electronic displays and more particularly relates to displays that are used in augmented reality (AR) display systems in a water environment.

BACKGROUND OF THE INVENTION

Head-mounted augmented reality (AR) display systems are being developed for a range of diverse uses including military, commercial, industrial, fire-fighting, and entertainment applications. For many of these applications, there is value in forming a virtual image that can be visually superimposed over the real-world image that lies in the field of view of the display system user. Additionally, professional and amateur athletes can take advantage of displayed information such as heart rate, and/or the user's location, and/or the surrounding environment, including rear views. Swimmers perform in a particularly demanding environment for head mounted display systems. In addition to the water infiltration issues associated with underwater electronic display systems, there are also head movement patterns, some of which are not typical of other sports, and the need for small, streamline form factor to reduce drag.

As is known to those skilled in the arts, for example for scuba divers, typical underwater AR systems can be bulky. Any type of camera mounting arrangement can produce significant drag on a swimmer.

Swimmers of all kinds, but particularly competitive swimmers, would benefit from being able to view forward, rear, and side views of the surrounding environment without having to stop or change body movement in any significant way from the swimming motion. Incorporating software into a swimmer's AR system to relieve mental activity not directly related to swimming motions, e.g. lap counting, distance estimations to turning points, etc., could significantly help the swimmer to keep focus on swimming motion and overall body control.

Therefore, there are benefits to a head-mounted display system for swimmers and other water related personal that performs in water, having the capability for displaying a variety of swimming, and/or swimmer-, and/or environment-related information to the user.

SUMMARY OF INVENTION

The present disclosure describes an advance in the art of virtual image presentation when using compact head-mounted devices and similar imaging apparatus in a water environment. Advantageously, embodiments of the present disclosure provide an AR optical imaging apparatus that forms a virtual image so that it can be readily viewed with the ability to change the information displayed, including the display of a sensed or otherwise communicated information. In some situations, audio may also be provided to the swimmer accompanying the display of the virtual images.

According to one aspect of the present disclosure, swimming goggles include a left-eye covering and a right-eye covering, each having a corresponding transparent window that defines a field of view and each further having a seal extending from the transparent window for sealing against the swimmer's face and formed to exclude water. A near-eye display is arranged in signal communication with a computational processing unit for forming virtual images that are viewable by one of the swimmer's eyes. The near eye display includes a waveguide within the field of view of one of the transparent windows, a projector for generating images, and coupling display optics for coupling the generated images into the waveguide and for directing the generated images as the virtual images from the waveguide to the swimmer's eye. One or more sensors are arranged in signal communication with the computational processing unit for conveying the orientation and motion of the near-eye display to the computational processing unit. The computational processing unit generates image data within the virtual image based on the sensed orientation and motion the near-eye display from the one or more sensors.

The waveguide is preferably attached to the one transparent window with a water-tight seal. A spacer can be positioned between waveguide and the one transparent window to form a water-tight sealed volume. The waveguide can include a prism and a mirrored surface. The one of more sensors can include at least one of an accelerometer, a magnetometer, and a gyro. One of the sensors can provide ranging distance data to the computational processing unit for generating distance information within the virtual image. One of the sensors can include a GPS positioning system. A wireless transceiver can be provided in communication with the computational processing unit for transmitting and receiving data from external sources.

The near-eye display can be arranged attachable to and detachable from the one of the transparent window. The goggles can further include a nose piece between the left-eye covering and the right-eye covering and respective temple regions extending from each of the left-eye covering and the right-eye covering. The near eye display can include a rigid frame that is attachable to at least one of the nose piece and one of the temple regions. The rigid frame can be made both attachable to and detachable from at least one of the nose piece and one of the temple regions.

According to another aspect of the present disclosure swimming goggles include a left-eye covering and a right-eye covering, each having a corresponding transparent window that defines a field of view and each further having a seal extending from the transparent window for sealing against the swimmer's face and formed to exclude water. A near-eye display in signal communication with a computational processing unit forms a virtual image in the left- or right-eye field of view. A camera for capturing image content is arranged in signal communication with the computational processing unit for conveying the image content to the computational processing unit. One or more sensors for sensing orientation and motion of the camera are arranged in signal communication with the computational processing unit for conveying the orientation and motion of the camera to the computational processing unit. The computational processing unit provides for generating image data within the virtual image based on the image content from the camera and the orientation and motion of the camera from the one or more sensors.

The near-eye display is preferably sealed together with the one transparent window against water infiltration between near-eye display and the one transparent window. The near-eye display and the computational processing unit can be repeatably attachable to and detachable from swimming goggles. A heat conductor can be provided in thermal contact with both the computational processing unit and the one transparent window to which the near-eye display is attached. The computational processing unit can comprise at least a CPU and power source, and the heat conductor can be in thermal contact with at least a portion of the CPU. The orientation and motion of the camera can be representative of the orientation and motion of the swimmer's head, and the image data within the virtual image can be rotated in the opposite direction with respect to the representative orientation and motion of the swimmer's head.

BRIEF DESCRIPTION OF THE DRAWINGS

FIGS. 13A-13E shows sketches of the orientation of the images displayed to user and the head tilt orientation.

DETAILED DESCRIPTION

Figure 1:
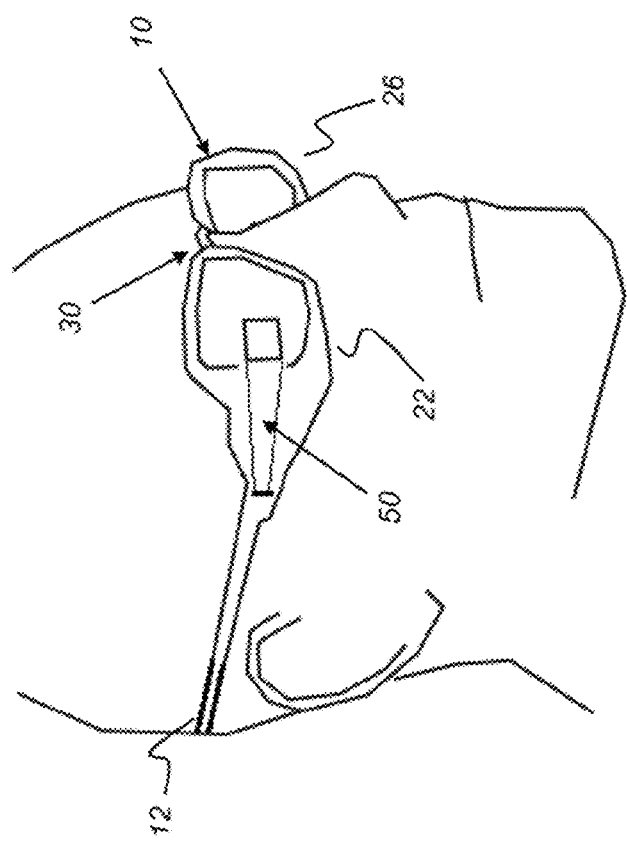
FIG. 1 is a drawing that shows a swimmer wearing a waterproof AR goggle display system.

The present description is directed to elements forming part of, or cooperating more directly with, apparatus in accordance with the invention. It is to be understood that elements not specifically shown or described may take various forms well known to those skilled in the art.

Where they are used herein, the terms "first", "second", and so on, do not necessarily denote any ordinal, sequential, or priority relation, but are simply used to more clearly distinguish one element or set of elements from another, unless specified otherwise.

By "exemplary" is meant to be "an example of", not intended to suggest any preferred or ideal embodiment.

In the context of the present disclosure, the terms "viewer", "swimmer", "operator", "observer", and "user" are equivalent and refer to the person who wears and views images using the AR viewing device.

The term "actuator" has its conventional meaning, relating to a device or component that can bring about an action in response to a stimulus, such as in response to an electrical signal, for example.

The term "set", as used herein, refers to a non-empty set, as the concept of a collection of elements or members of a set is widely understood in elementary mathematics. The term "subset", unless otherwise explicitly stated, is used herein to refer to a non-empty proper subset, that is, to a subset of the larger set, having one or more members. For a set S, a subset may comprise the complete set S. A "proper subset" of set S, however, is strictly contained in set S and excludes at least one member of set S.

As an alternative to real image projection, an optical system can produce a virtual image display. In contrast to methods for forming a real image, a virtual image is not formed on a display surface. That is, if a display surface were positioned at the perceived location of a virtual image, no image would be formed on that surface. Virtual image display has inherent advantages for augmented reality presentation. For example, the apparent size of a virtual image is not limited by the size or location of a display surface. Additionally, the source object for a virtual image may be small; a magnifying glass, as a simple example, provides a virtual image of its object. In comparison with systems that project a real image, a more realistic viewing experience can be provided by forming a virtual image that appears to be some distance away. Providing a virtual image also obviates the need to compensate for screen artifacts, as may be necessary when projecting a real image.

In the context of the present disclosure, the term "coupled" is intended to indicate a physical association, connection, relation, or linking, between two or more components, such that the disposition of one component affects the spatial disposition of a component to which it is coupled. For mechanical coupling, two components need not be in direct contact, but can be linked through one or more intermediary components. A component for optical coupling allows light energy to be input to, or output from, an optical apparatus.

In the context of the present disclosure, the phrase "in signal communication" indicates that two or more devices and/or components can communicate with each other via signals that travel over some type of signal path. Signal communication may be wired or wireless. The signals may be communication, power, data, or energy signals. The signal paths may include physical, electrical, magnetic, electromagnetic, optical, wired, and/or wireless connections between the first device and/or component and second device and/or component. The signal paths may also include additional devices and/or components between the first device and/or component and second device and/or component.

FIG. 1 is a drawing showing a swimmer wearing a waterproof AR goggle display system 10. As shown, the goggle display system 10 consists of a flexible strap 12 that extends around the head to secure the goggle display system 10 to the swimmer. The flexible strap attaches to a right-eye covering 22 of the goggle display system 10 and to a left-eye covering 26. The right-eye and left-eye coverings 22, 26 are coupled to one another via a nose bridge 30. In the embodiment depicted in FIG. 1, a near-eye display 50 is attached to the right-eye covering 22 of goggle display system 10 for displaying a virtual image to the wearer. In an alternate embodiment, near-eye display 50 is attached to the left-eye covering 26. In another alternate embodiment for binocular or stereoscopic viewing, there is a separate near-eye display attached to right-eye covering 22 and to left-eye covering 26. In one embodiment, near-eye display 50 is detachable from right-eye covering 22 and from flexible strap 12.

Figure 2:
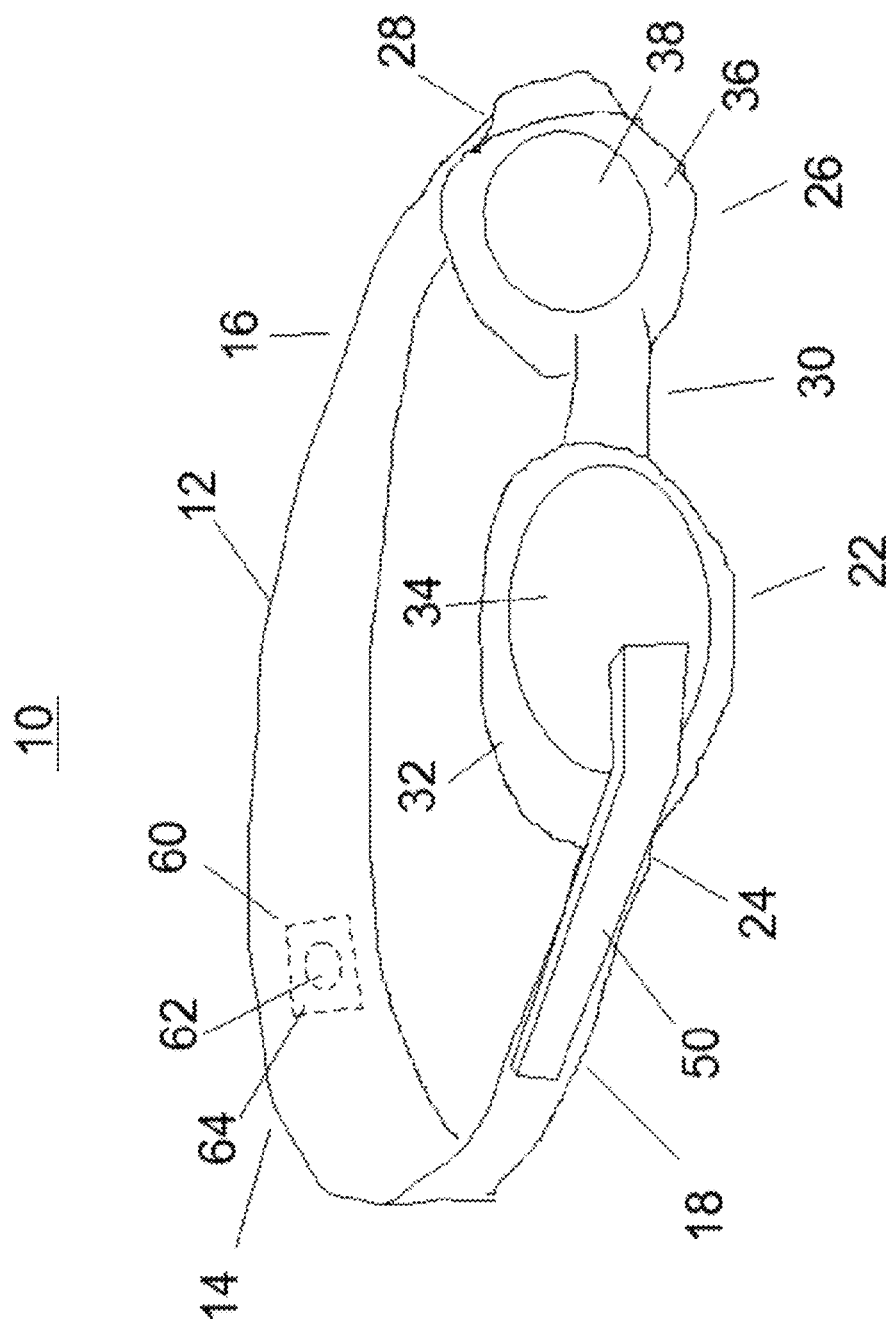
FIG. 2 is a schematic diagram providing components of the disclosed AR goggle display system.

FIG. 2 is a drawing providing additional detail of AR goggle display system 10. Flexible strap 12 has a rear end region 14, a right temple region 18 and a left temple region 16. Right strip temple region 18 is attached to right-eye covering 22 at right strap connection 24. Left strip temple region 16 is attached to left-eye covering 26 at left strap connection 28. Right-eye covering 22 is connected to left-eye covering 26 via nose bridge 30.

Continuing to refer to FIG. 2, right-eye covering 22 consists of right-eye water seal 32 and right-eye transparent window or plate 34. Thus, the right-eye covering 22 isolates the right eye from water penetration with the swimmer's head underwater. In a similar way, left-eye covering 26 consists of left-eye water seal 36 and left-eye transparent window or plate 38. Thus, the left-eye covering 26 isolates the left eye from water when the wearer of AR goggle system 10 with the swimmer's head underwater. Either or both transparent windows 34, 38 could be tinted or provide some type of light filtration. Either or both transparent windows 34, 38 may have optical power for vision correction.

Continuing to refer to FIG. 2, and to the embodiment therein, waterproof near-eye display 50 is attached to right strap temple region 18 and extends across at least a portion of right transparent window 34 providing a mechanism for displaying a virtual image to the right eye. In another embodiment, near-eye display 50 is attached to right-eye covering 22. In another embodiment, near-eye display 50 is attached to right strap connection 24. In another embodiment, near-eye display 50 is attached to right strap temple region 18, and/or right strap connection 24 and or right water seal 32. In one embodiment, near-eye display 50 is detachable from right strap temple region 18, right strap connection 24, right water seal 32, and right transparent window 34. In yet another embodiment, near-eye display 50 extends across the transparent window 34 and is attached to at least the nose bridge 30. In another embodiment, near-eye display 50 is molded as an integral part of at least one of right strap temple region 18, right strap connection 24, right water seal 32, and right transparent window 34.

Continuing to refer to FIG. 2, and to the embodiment therein, rear strap region 14 contains waterproof rear-view camera system 60. In one embodiment, rear-view camera system 60 is detachable from rear strap region 14. In another embodiment, rear-view camera system 60 is built into rear strap region and is not removable.

Waterproof rear-view camera system 60 has a waterproof rear-view camera 62 and waterproof rear-view camera controller 64. In one embodiment, rear-view camera controller 64 consists of a power source (not shown) and connection (not shown) for communicating with near-eye display 50. In one embodiment, rear-view camera controller 64 and near-eye display 50 share the same power source (not shown) such as by connecting wires (not shown). In one embodiment the same cabling or other connection used for communicating with near-eye display 50 provides a mechanism for conveying at least image data from the rear-view camera 62 to the computational processing unit of near-eye display 50 (not shown). In one embodiment, communication with near-eye display 50 uses a WiFi communications system. In another embodiment, a combination of wires provides communication with near-eye display 50. In one embodiment a collection of communication wires can be embedded into flexible strap 12.

Figure 3A:
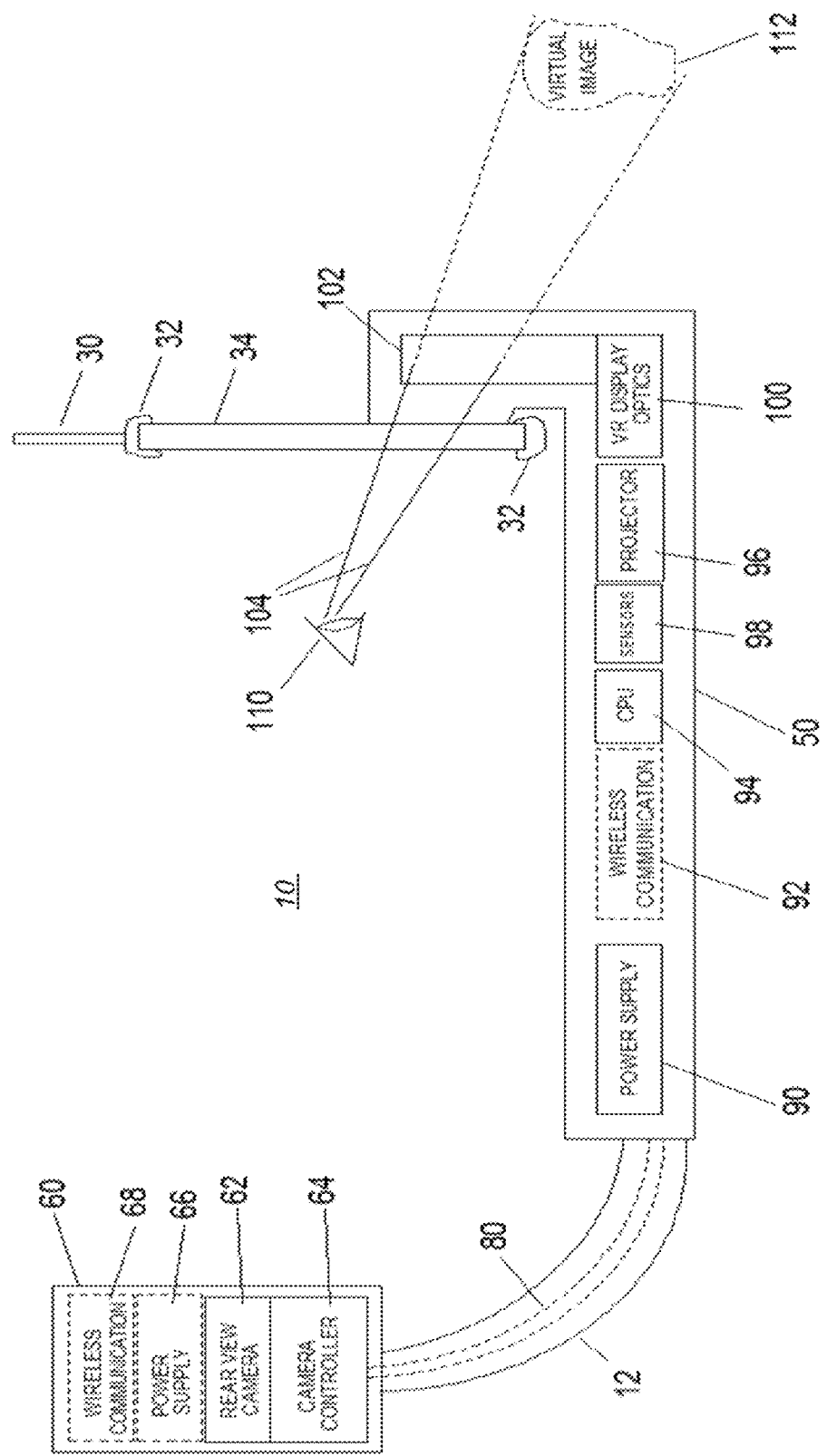
FIG. 3A is an additional component view of the disclosed near-eye display.

FIG. 3A is a schematic providing further details of the components for the AR goggle system 10. Near-eye display 50 can have a power supply 90, a computational processing unit 94, a collection of sensors 98, a micro-projection system 96 and coupling display optics 100 used to couple the image generated by projector 96 to image output waveguide display 102. Image output waveguide display 102 directs image bearing rays 104 to the viewer's eye 110 such that a virtual image 112 appears to be at a position forward of the near-eye display 50. In one embodiment, projector 96, display optics 100, waveguide display 102 form a Liquid Crystal on Silicon (LCoS) display system where waveguide display 102 is a prism or prism and mirror combination. In another embodiment, projector 96, display optics 100, and waveguide display 102 form a Ferroelectric Liquid Crystal on Silicon (FLCoS) display system.

Continuing with FIG. 3A, AR goggle system 10 further has waterproof rear-view camera system 60 that has a rear-view camera 62 and a camera controller 64. In one embodiment, rear-view camera system 60 further consists of an electrical power supply 66 capable of providing electrical power to the camera controller 64 and rear-view camera 62. In another embodiment, electrical power is provided by power source 90 of near-eye display 50 via cable bundle assembly 80. In one embodiment, cable bundle assembly 80 is embedded within flexible strap 12. In another embodiment, cable bundle assembly 80 is external and separate from flexible strap 12.

Images captured by rear-view camera system 60 may be still images or may be a video stream of images. In one embodiment, this image stream and/or video stream is transmitted to near-eye display 50 via optional wireless communication 68 of rear-view camera system 60 and optional wireless communication 92 of near-eye display 50. In another embodiment, captured images and/or video stream are transmitted to near-eye display 50 via optional cable bundle assembly 80 connecting rear-view camera system 60 to near-eye display 50.

One or more sensors 98 in goggle system 10 can provide signals that are indicative of the position and movement of the swimmer's head and, correspondingly, of the position, angular orientation, and movement of the rear-view camera 62. In one embodiment, sensors 98 consist of at least an accelerometer. In another embodiment sensors 98 include a GPS positioning system. In another embodiment, sensors 98 includes a compass. In another embodiment, sensors 98 include other positioning devices. In one embodiment, sensors 98 include tilt, tip, and yawl sensors for determining the orientation of the head.

In one embodiment, wireless transponder 92 provides a channel for wireless communication with external systems (not shown). In one embodiment, wireless transponder 92 is used to transmit still images, or a video stream of images recorded by rear-view camera system 60. In another embodiment, wireless transponder 92 is used to transmit data from sensors 98 to external systems (not shown). In another embodiment, wireless transponder 92 is used to transmit a combination of still images, or a video stream recorded by rear-view camera system 60 and some or all the data collected by sensors 98. In yet another embodiment, wireless transponder 92 is used to receive still images, video streams and/or audio streams.

Computational processing unit (CPU) 94 can include a central processing unit suitable for executing a stored computer program, a memory system (not shown) suitable for storing a computer program as well as other digital data, e.g. images from rear-view camera system 60, and communication circuitry (not shown) to collect and send digital data from and to other components of the AR goggle system 10, e.g. the sensors 98, and/or the optional wireless transponder 92, and to the optical projector system 96. In one embodiment, computational processing unit 94 generates a digital representation of an optical image and transmits a digital representation of the optical image to an optical projector system 96. In another embodiment, computational processing unit 94 applies image processing algorithms to at least one image obtained by rear-view camera system 60 and transmits the resulting digital image to optical projector 96 for display to the user's eye 110. In another embodiment, computational processing unit 94 applies image processing algorithms to a stream of images obtained by rear-view camera system 60 and transmits a portion of the resulting processed digital image stream to optical projector 96 for display to user's eye 110. In another embodiment, computational processing unit 94 applies image processing algorithms to at least one image obtained by rear-view camera system 60, as well as processes data obtained from sensors 98 and then combines the processed image and processed sensor data into a composite digital image that is transmitted to optical projector 96 for display to user's eye 110.

In another embodiment, algorithms process data from sensors 98 to determine the orientation of the camera 62 or, correspondingly, of the user's head. In one embodiment, when the user's head is in one position, the digital image generated by computational processing unit 94 is a processed image from image data obtained from rear-view camera system 60. When the user's head is in another position, determined by the algorithm and processing of data provided by sensors 98, other data is used to generate digital image data that is not based on the image data obtained from rear-view camera system 60, e.g. the data obtained from sensors 98. In one embodiment generated image data consists of at least a swimmer's lap count. In this way, through algorithms applied to data from sensors 98, the image displayed, and thus the information displayed, to the user is automatically switched depending on the user's head orientation and/or head movement. In another embodiment, switching of the image to be displayed is controlled by an external controller such as an electronic clicker (not shown, but see FIG. 12) that is in signal communication with optional transponder 92 and acts as a toggle for switching system behavior between two or more alternatives. An electronic clicker may be a wireless mouse type clicker mounted, for example, on a ring, or otherwise attached to a finger or attached to a portion of the hand. The electronic clicker may be embedded into a mouth guard such that the pressure of the tongue or the pressure of teeth onto the mouth guard activates a clicking event.

In one embodiment, the image processing algorithm rotates the digital image to be displayed based on the user's head orientation, determined by processing sensor data received from sensors 98. In one embodiment, the image to be displayed is rotated in the opposite direction with respect to head rotation. With this behavior, the orientation of the resulting displayed image appears to the user as fixed, rather than rotated in space. In one embodiment, the sensors 98 determine if the near-eye display 50 is mounted to the left strap temple region 16 or to the right strap temple region 18 and rotate images to be displayed accordingly, so that near-eye display 50 may be used on either side of the user's head.

Figure 3B:
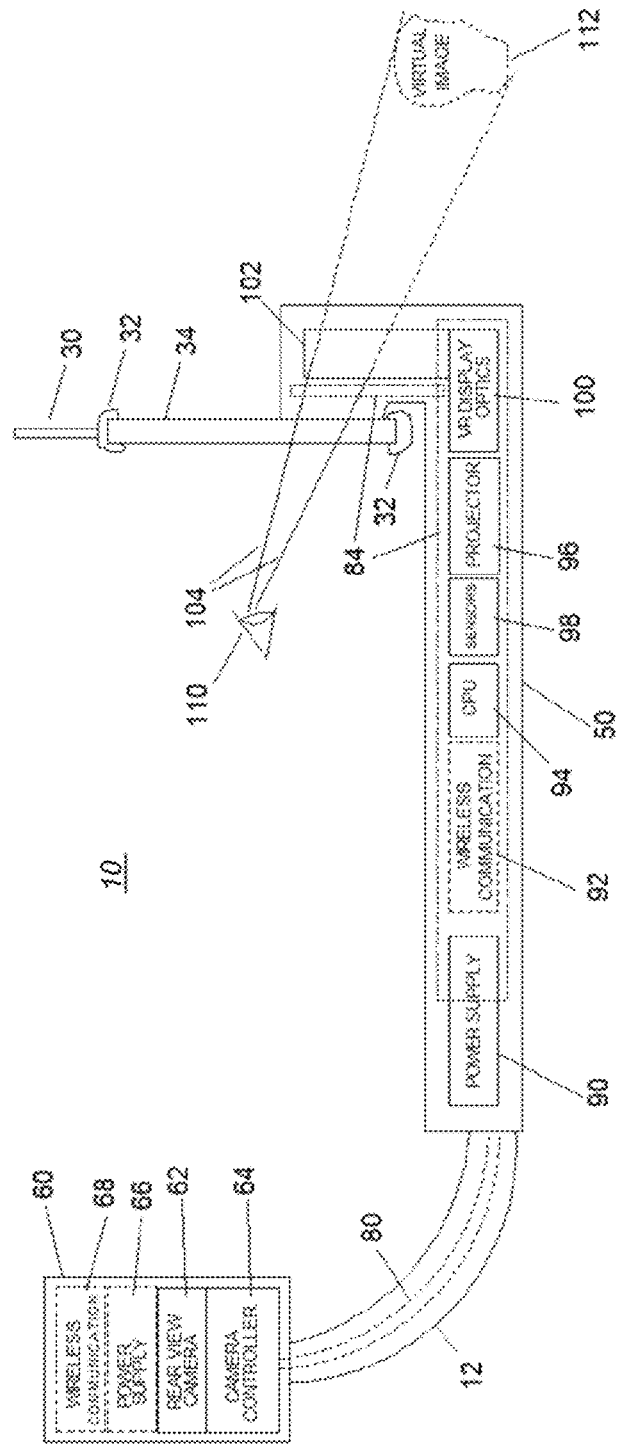
FIG. 3B is an additional component view of the disclosed near-eye display comprising an additional heat conductor.

FIG. 3B is a schematic providing further details of the components for the AR goggle system 10. Optional heat conductor 84 is in at least partial contact with heat generating electrical elements, 90, 92, 94, 96, 98, and/or 100, and provides a heat path to lower temperature housing 86 of near-eye display 50 that is in contact with transparent window 34. In this way, transparent window 34 is partially heated by waste heat of the electrical elements 90, 92, 94, 96, 98, and/or 100 and reduces or eliminates condensation from forming on transparent window 34.

Figure 4:
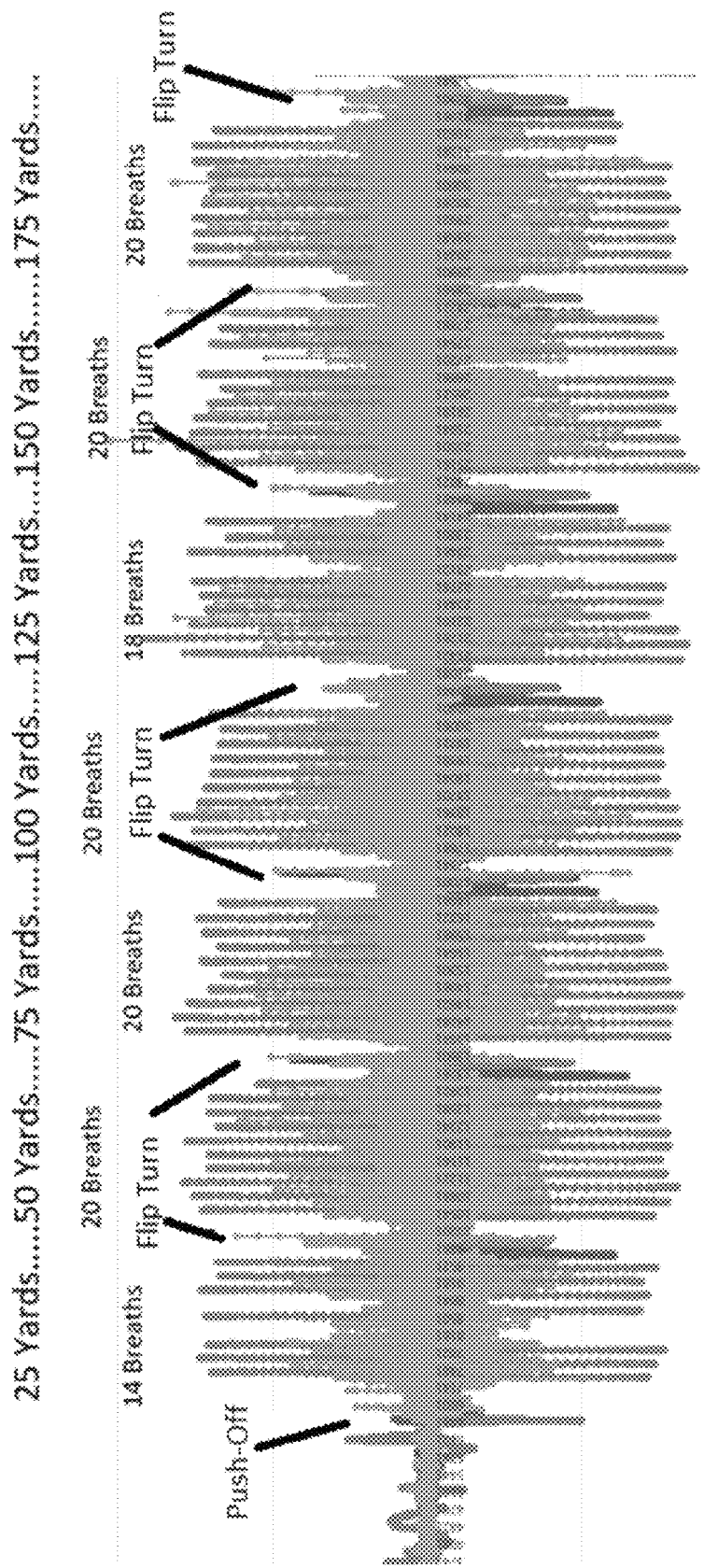
FIG. 4 is a graph of data collected from sensors of the disclosed AR goggle display system.

FIG. 4 is a graph of exemplary data from sensors 98. From the sensors 98, and the algorithms used to process sensor data, it is possible to track timing of measurable data and events, including when the swimmer begins swimming, the number of breaths, and when the swimmer executes a flip turn, for example. Identifying each flip turn execution provides a lap count for the swimmer.

In one embodiment, rear-view camera system 60 may additionally consist of a sensor array. In one embodiment sensors sense the position of the camera independent of the head position. In another embodiment, and by virtue of the camera being secured to the head, sensor array of rear-view camera system 60 senses head and camera angular orientation. In one embodiment, the sensor array may include sensing for measuring the heart rate of the wearer. In another embodiment, the sensor array may measure one or more environmental characteristics such as the water's saline concentration, temperature, or chlorine concentration, for example. In yet another embodiment, the sensor array may measure one or multiple parameters including heart rate of the wearer, water temperature, saline concentration, chlorine concentration and/or other biological and/or other environmental parameters. Data from the sensor array can be transmitted to computational processing unit 94 by a wireless transponder 68 or through cable bundle assembly 80, or by other mechanisms known to those skilled in the data communications art.

Figure 5:
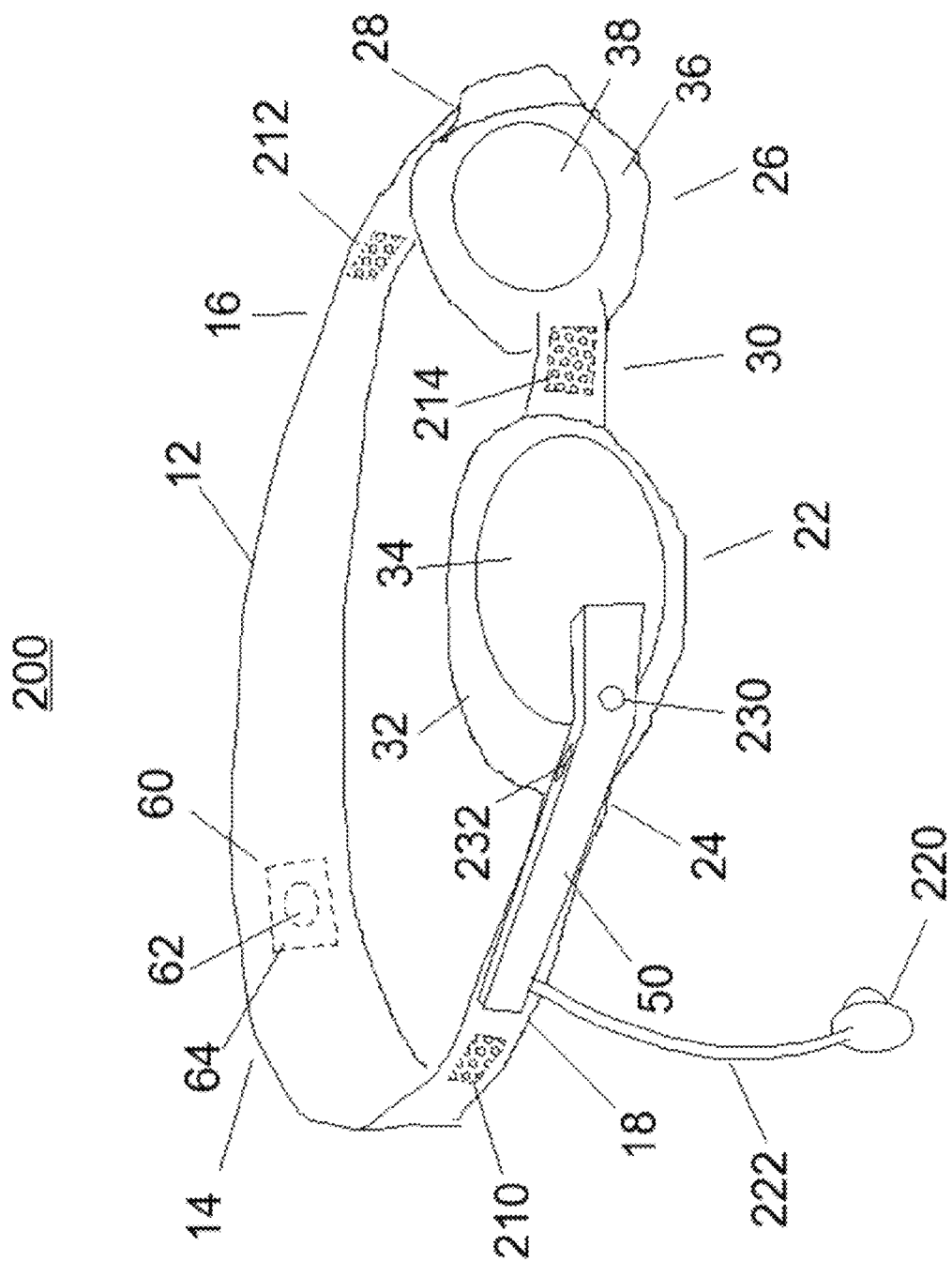
FIG. 5 is drawing of another embodiment of the disclosed AR goggle display system.

FIG. 5 provides a drawing of yet another embodiment of the invention. As shown in FIG. 5, a waterproof AR goggle system 200 has at least the AR goggle system 10 of FIG. 1, where like numbering indicates like components. Continuing with FIG. 5, and to the embodiment therein, AR goggle system 200 further has an optional right sensor array 210. The sensor array 210 may have at least a right-view camera. In one embodiment, right sensor array 210 has one or more biological and/or environmental sensors. AR goggle system 200 further has an optional left sensor array 212. The sensor array 212 may have at least a left-view camera. In one embodiment, left sensor array 212 has one or more biological and/or environmental sensors. AR goggle system 200 further has an optional front sensor array 214. The sensor array 214 may have at least a front-view camera. In one embodiment, front sensor array 214 also has biological and/or environmental sensors.

In another embodiment, a front-facing port 230 integrated into near-eye display 50 may be used for a front-view camera system. In another embodiment, front-facing port 230 may be used for a front mounted sensor array providing biological and/or environmental sensed data. In one embodiment, front-facing port 230 is part of a micro sonar sensing system, the micro sonar sensing system may biological and/or environmental sensed data 4. In another embodiment, front-facing port 230 may be used for a micro laser ranging system. In another embodiment, a top facing port 232 integrated into near-eye display 50 may be used for a top-view camera system. It is to be understood that a top-view camera becomes a front-view camera as the user swims in an essentially horizontal position. In another embodiment, top facing port 232 may be used for a top mounted sensor array providing biological and/or environmental sensed data. In one embodiment, top facing port 232 is part of a micro sonar sensing system, the micro sonar sensing system may provide ranging distance data to computational processing unit 94. In another embodiment front-facing port 230 may be used for a micro laser ranging system. In yet another embodiment, the ports 230 and 232 may provide sensors for measuring one or multiple parameters including water temperature, saline concentration, chlorine concentration and/or other biological and/or other environmental parameters.

Continuing with FIG. 5, and with the embodiment therein, there can be components that provide audio signals to the wearer of AR goggle system 200. Right ear plug speaker 220 is connected to cable assembly 222 which is itself connected to near-eye display 50, and thus to the computational processing unit 94 and optionally to wireless communication transponder 92. In one embodiment, cable assembly 222 is detachable from near-eye display 50. In another embodiment, right ear plug speaker 220 includes circuitry for wireless communication with wireless communication transponder 92 of near-eye display 50, and/or with external audio signal transmitter (not shown).

In another embodiment, not shown, sensor arrays 210 and/or 212 and/or near-eye display 50 provide transcranial hearing apparatus. As is known to those skilled in the arts, transcranial hearing using contralateral routing of audio signals is a type of hearing aid that uses the conductivity of the skull to transmit sound. In this way, elements 222 and 220 of FIG. 5, can be eliminated without loss of audio capabilities.

Figure 6A:
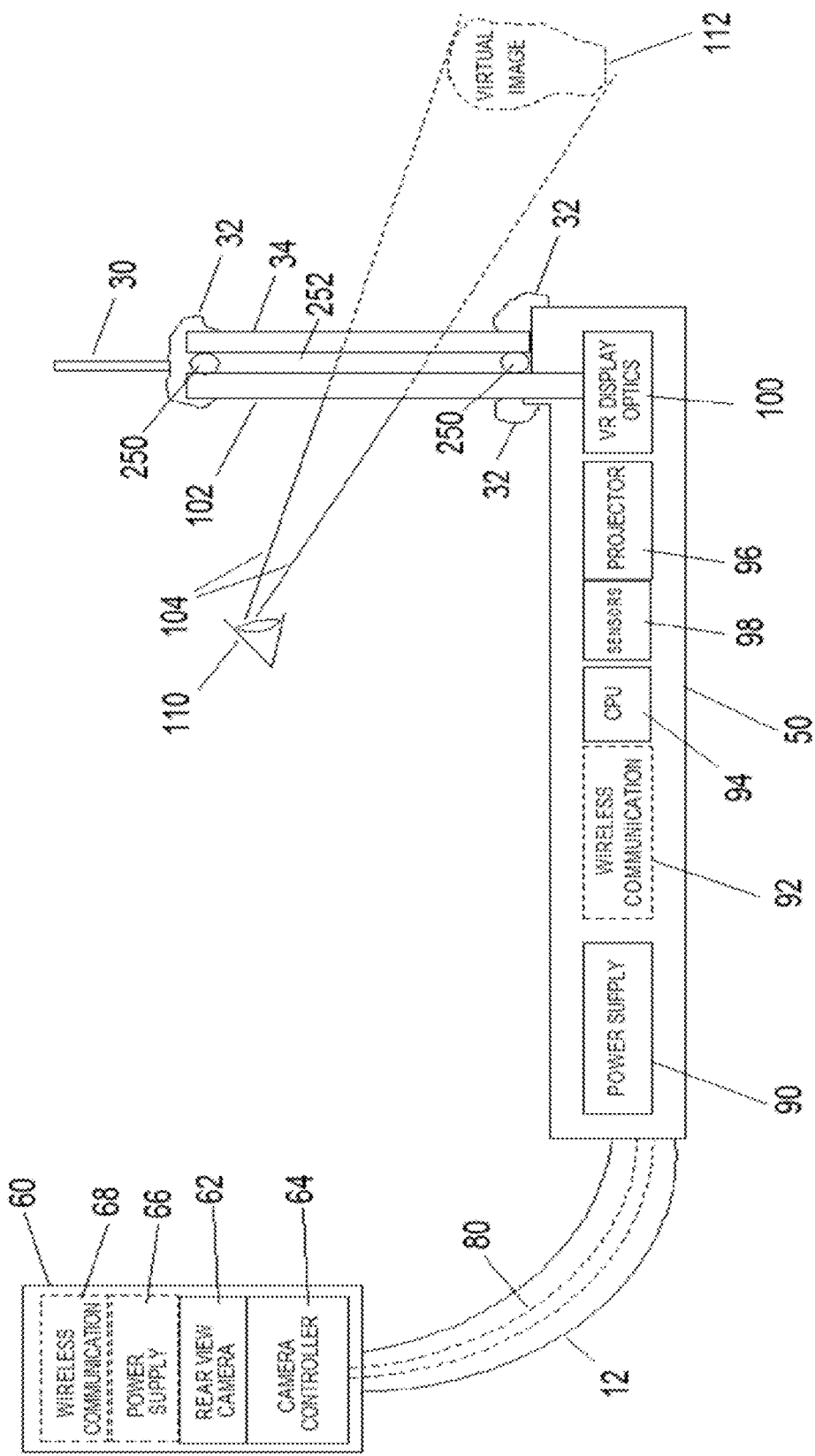
FIG. 6A is an additional component view of a near-eye display with display waveguide display.

FIG. 6A is a schematic of one embodiment wherein like numbers refer to like elements. In the embodiment shown, image output waveguide display 102 is positioned closest to the eye 110 and right transparent window 34 is positioned further away from the eye 110. Both windows 102 and 34 are embedded within right water seal 32. A spacer 250 is positioned between waveguide 102 and window 34 forming a water-tight sealed volume 252. Spacer 250 may be a gasket or an o-ring or epoxy or may employ other sealing methods known to those skilled in the arts of water sealing. The water-tight sealed volume 252 may contain a trapped gas to eliminate the possibility of condensation on the waveguide 102 and transparent window 34 inner surfaces. By way of example, the sealed volume 252 can contain air, nitrogen gas, or argon gas or may have a full or partial vacuum. In yet another embodiment sealed volume 252 contains dry air.

Figure 6B:
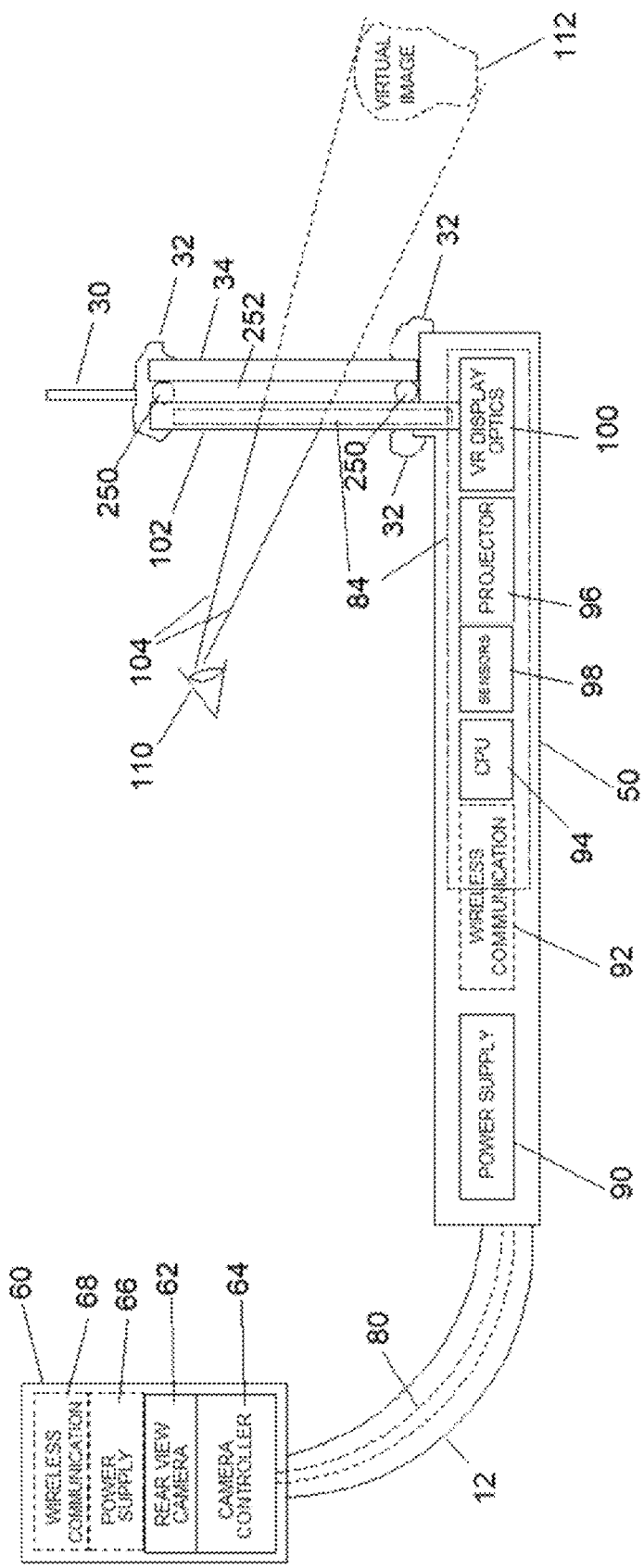
FIG. 6B is an additional component view for a near-eye display with a waveguide display and a heat conductor element.

FIG. 6B is a schematic of one embodiment wherein like numbers refer to like elements. In the embodiment depicted, an additional heat conductor 84 used to transfer heat generated from the electronics 90, 92, 94, 96, 98, and/or 100 is connected to a portion of waveguide 102. In this way, excess heat is drawn away from the electronics and is utilized in keeping the waveguide warm, thus preventing condensation from forming on the waveguide 102. In another embodiment, heat conductor 84 is also connected to a portion of transparent window 34 to warm the transparent window 34 to prevent condensation from form on the transparent window 34.

Figure 7:
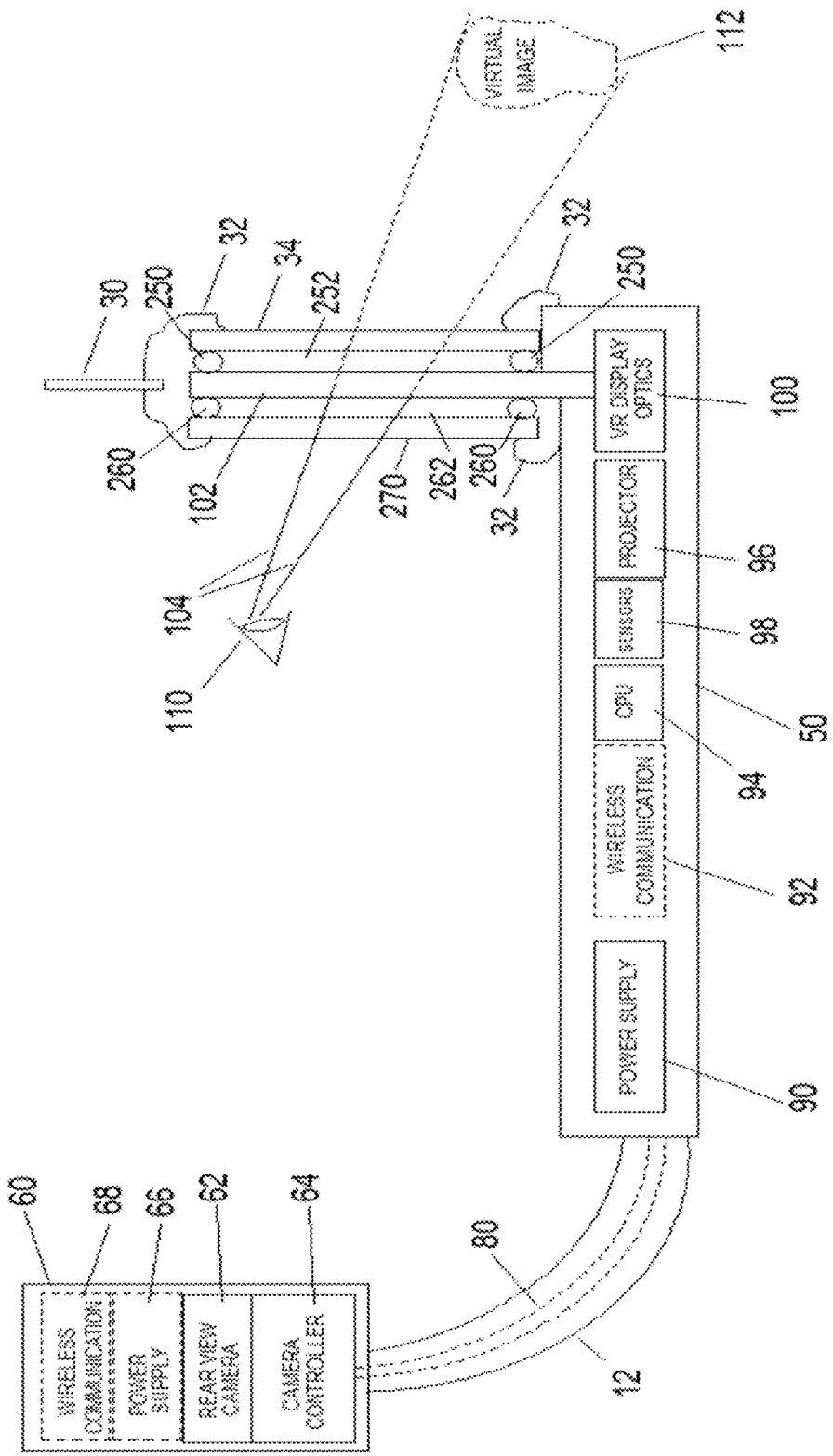
FIG. 7 is an additional component view of a near-eye display with a waveguide display in a water-tight cavity.

FIG. 7 is a schematic of one embodiment wherein like numbers refer to like elements. In the embodiment shown, image output waveguide display 102 is positioned between two transparent windows 34 and 270. Waveguide display 102 can be a diffractive waveguide such as an exit pupil expander, for example, that directs light to an eyebox, wherein the directed light forms a virtual image 112 for the swimmer. A spacer 250 is positioned between waveguide 102 and window 34 forming a water-tight sealed volume 252. Additionally, a spacer 260 is positioned between waveguide 102 and window 270 forming a water-tight sealed volume 262. Spacer 260 may be a gasket or an O-ring or suction cup or epoxy or may employ other sealing methods known to those skilled in the sealing arts. The water-tight sealed volumes 252, 262 may contain a gas to eliminate the possibility of condensation on the waveguide 102 and the transparent windows 34, 270 surfaces. The water-tight sealed volume 252 may contain a trapped gas to eliminate the possibility of condensation on the waveguide 102 and transparent window 34 inner surfaces. By way of example, the sealed volume 252 can contain air, nitrogen gas, or argon gas or may have a full or partial vacuum. In yet another embodiment sealed volume 252 contains dry air.

Figure 8:
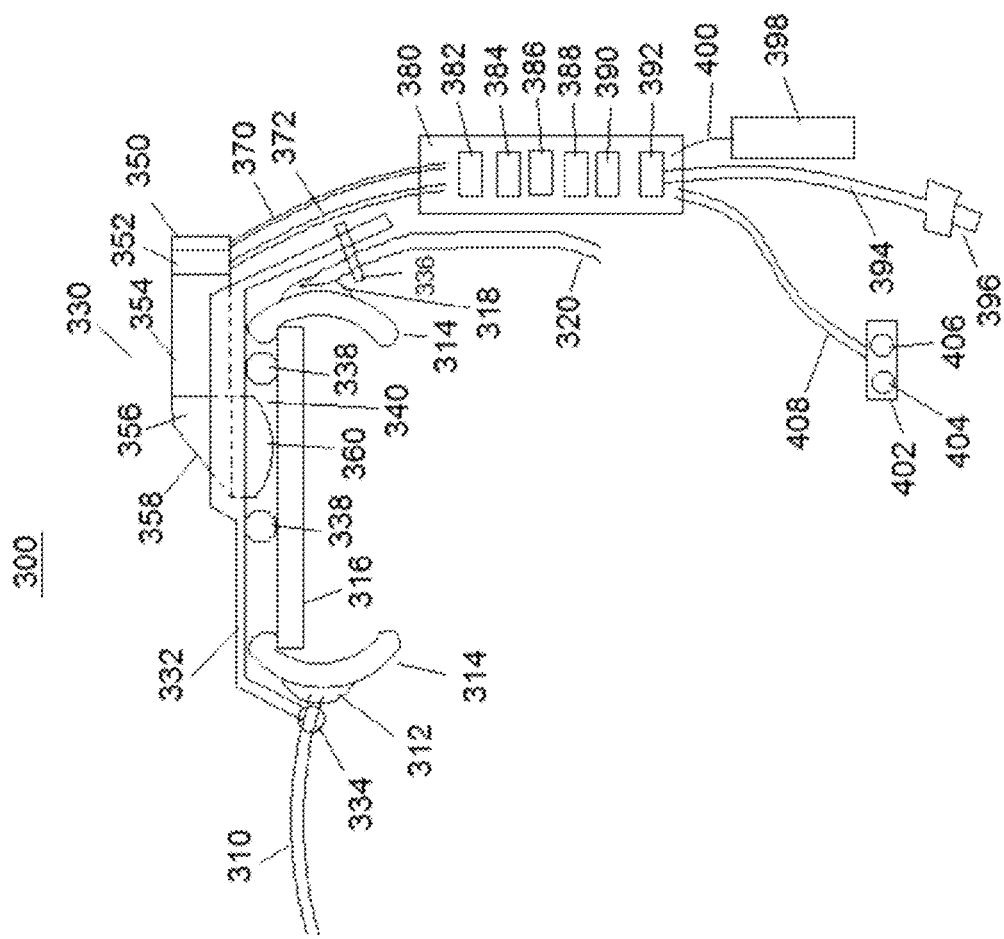
FIG. 8 is a sketch and component view of one embodiment of right half goggle and detachable AR system.

FIG. 8 is a top-down cut-away schematic and component drawing of one embodiment. In FIG. 8, right portion of goggle with AR system 300 is shown having a nose bridge 310, and nose bridge connection 312 that connects to the right-eye socket water seal 314. The eye socket water seal 314 contains a transparent window 316 secured to the eye socket seal forming a water-tight seal such that a water-tight volume is maintained about the swimmer's eye. Right-eye socket water seal 314 further has a strap connection 318 that provides one way to secure flexible strap 320 to goggles.

Continuing with FIG. 8, and to the embodiment therein, a detachable AR system 330 is shown attached to goggles. AR system 330 has a rigid frame 332 and a frame nose connection 334 that secures rigid frame 332 to nose bridge 310. In another embodiment, not shown, the connection 334 connects the rigid frame 332 to the nose bridge connection 312. In yet another embodiment, not shown, the connection 334 secures rigid frame 332 to the water seal 314.

Continuing with FIG. 8, rigid frame 332 further has a frame connection 336 that secures the rigid frame 332 to flexible strap 320. In another embodiment, not shown, the connection 336 connects the rigid frame 332 to the strap connection 318. In yet another embodiment, not shown, the connection 336 secures rigid frame 332 to the water seal 314.

Continuing with FIG. 8, gasket 338 provides a water-tight seal between rigid frame 332 and transparent window 316, forming a water-tight sealed volume 340. It is to be understood that the rigid frame 332 connects to the goggles by connections 334, 336 in such a way as to provide sufficient force onto the gasket 338 to form the water-tight sealed volume 340.

As shown in FIG. 8, secured to rigid frame 332 are back lighting 350 for display 352 for generating an image to be displayed. The display 352 is positioned at a distance from prism 356 by extension cavity 354 to achieve appropriate focal distance of the optical system. The prism 356 has a mirrored surface 358 directing image bearing light (not shown) from display into optic 360. In one embodiment, optic 360 is a cylinder lens. It is to be understood that back light 350, display 352, extension cavity 354, prism 356 and optic 360 are secured to rigid frame 332 and enclosed in water-tight enclosure (not shown).

Continuing with FIG. 8, and with the embodiment therein, a back light flexible power cable 370 connects the back light 350 to circuit board 380 and provides a mechanism for delivering electrical power to the back light 350. Additionally, display power and video signal flexible cable assembly 372 connects display 352 to the circuit board 380. The flexible cable assembly 372 provides one way to deliver electrical power, and video signals to the display 352. Flexible power cable 370 and flexible cable assembly 372 may be bundled or enclosed into a single water proof flexible cable assembly (not shown). The circuit board 380 has sensors 382 which in one embodiment consist of one or more of an accelerometer, a magnetometer, and/or a gyro. Circuit board 380 further has a memory chip 384, a CPU 386, a GPS chip 388, a Wifi chip transceiver 390 and a USB chip with connector 392. A USB cable 394 is connected to the USB chip 392. The USB cable 394 has disposed at one end a USB connector 396 allowing connection to external devices (not shown) and provides one way to charge battery 398, the battery being connected to the circuit board 380 by battery cable 400. Additionally, button assembly 402 is connected to the circuit board 380 via button cable assembly 408. The button assembly 402 has at least an on/off button 404 and a reset/start/stop button 406. In one embodiment, (not shown) elements 382 through 392 are attached to individual, separate circuit boards that are themselves connected together to form a flexible assembly. In another embodiment circuit board 380 is a flexible circuit board.

It is to be understood that back light flexible power cable 370, display power and flexible signal cable assembly 372, circuit board 380, battery cable 400, battery 398, USB cable 394, button cable assembly 408, button assembly 402, on/off button 404, reset/start/stop button 406 and their connections to connecting components are sealed (not shown) against water infiltration. In one embodiment, the sealing of components is accomplished by electrical heat shrink wrap and water proof epoxy.

In one embodiment (not shown, but refer to FIG. 3B and FIG. 6B) a heat conductor (84 of FIGS. 3B, 6B) may be in contact with some or all the heat generating electrical elements 380 through 392 of circuit board 380 and in contact with a portion of rigid frame 332 and/or a portion of optic 360 that are in contact with or in close proximity to transparent window 316. Heat is therefore transferred from some of the heat generating electrical components 380 through 392 to the transparent window 316. In this way, condensation is prevented from forming onto transparent window 316.

Operation

Figure 9:
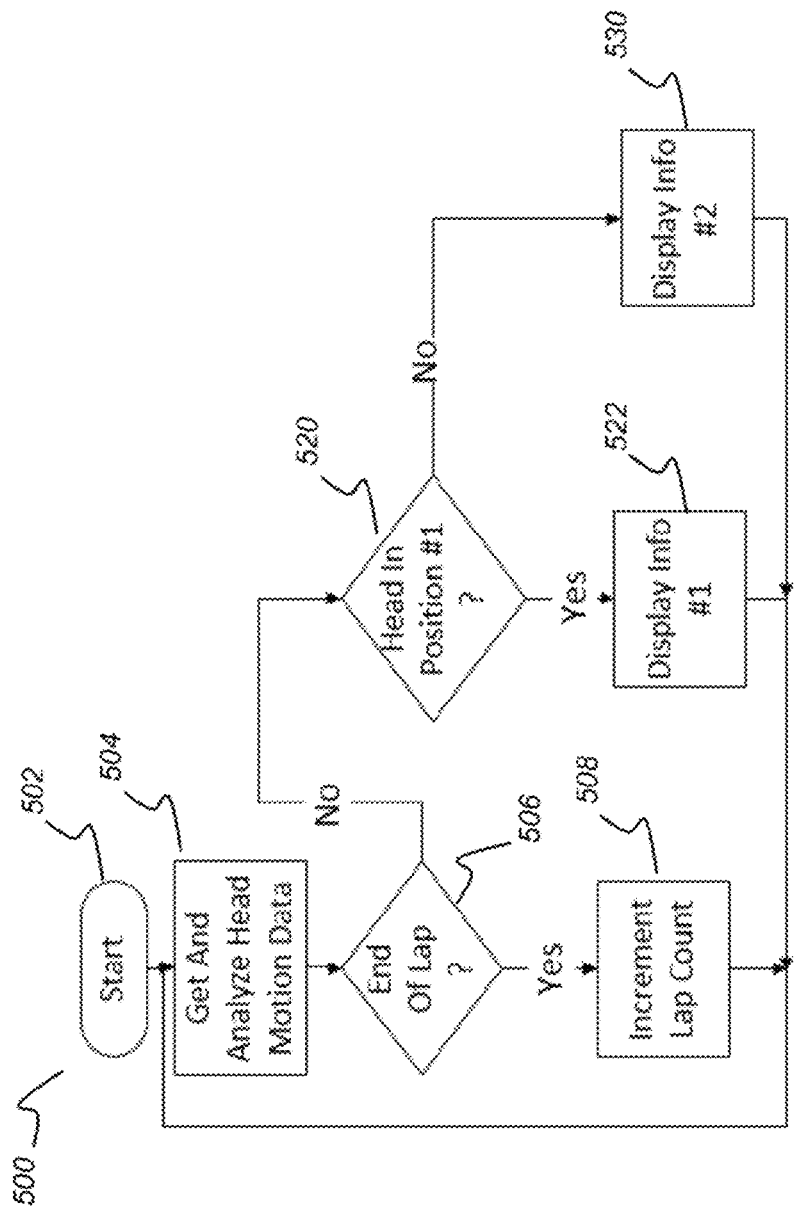
FIG. 9 is a logic flow diagram that shows the control of content of image displayed to the user depending on motion sensor analysis.

FIG. 9 is a flow chart for one embodiment of sensing, processing, and display of information to the user. In the embodiment shown, the process 500 starts 502 when, for example, detachable AR system 330 of FIG. 8, is powered on. The process 500 obtains and analyzes head motion and position data, in step 504, from sensors 382. Based on the sensed data, an end of lap detection decision 506 is made. If there is a detected end of lap, the "Yes" branch of decision 506 is followed to the increment lap count 508 process where the internal lap counter is incremented by one. The process flow then returns to obtain and analyze head motion data process 504. If the end of lap decision 506 is "No", indicating that an end of lap has not occurred, then the head sensed data is used to determine if the head of the user is in a first position (orientation). Decision process 520 flows to display info #1 process 522 when the decision process 520 determines "Yes" that the head is in position #1. This process 522 displays a first set of data and information to the user. The process then proceeds to the obtain and analyze head motion data 504 process. When decision process 520 determines that the head of the user is not in position #1, then the process 500 proceeds to process 530 and displays display info #2 to the user. The process 500 then proceeds to the get and analyze head motion data 504 process. In this way, predetermined and programmed information and data is displayed to the user depending on the motion of the user. The process can continue until terminated by the swimmer or until electrical power is turned off.

In one embodiment, display info #1 process 522 displays at least the current lap counter value to the user and display info #2 process 530 displays at least the rear camera view to the user. In another embodiment, display info #1 process 522 displays at least a pace clock in real-time.

Figure 10:
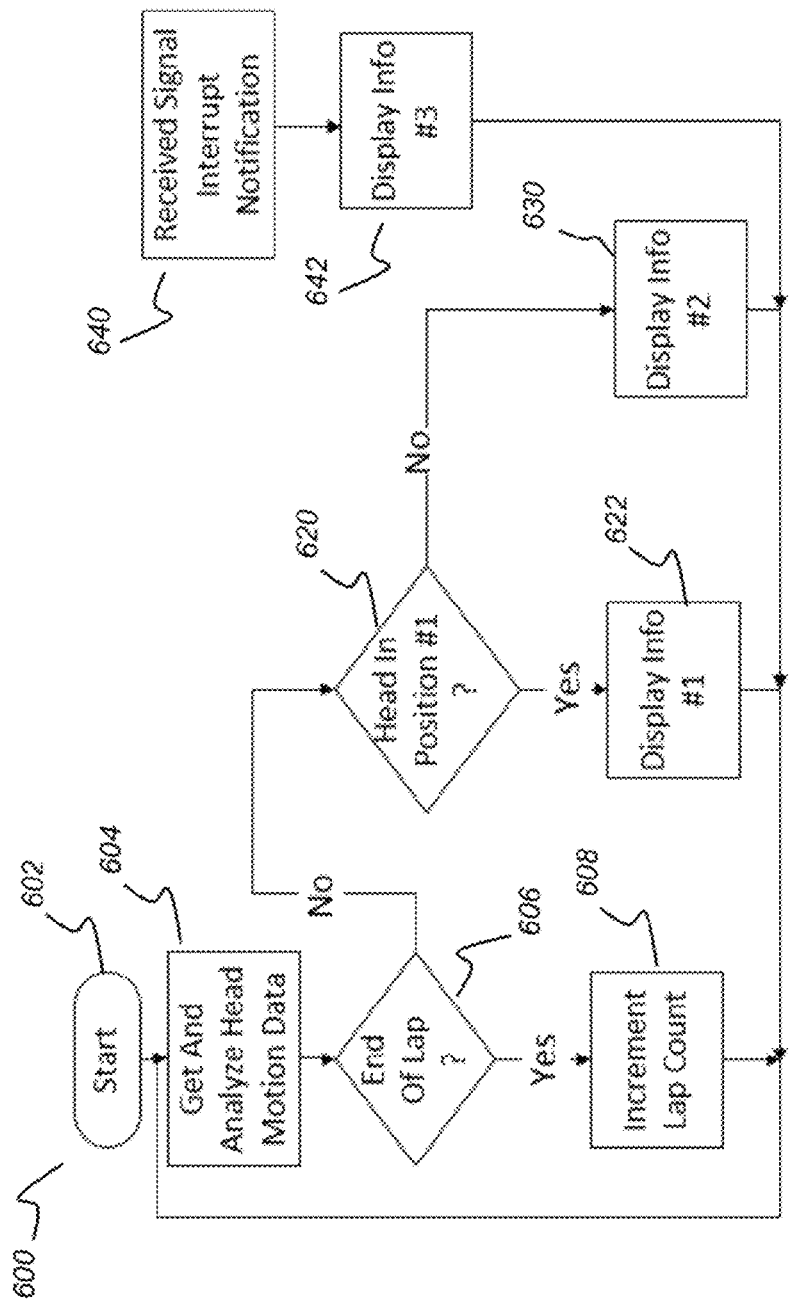
FIG. 10 is a logic flow diagram that shows the control of content of image displayed to the user depending on motion sensor analysis and external interrupt signal.

FIG. 10 is a flow chart for an alternate embodiment of the sensing, processing, and displaying of information to the user. In the embodiment shown, the process 600 starts 602 when, for example, detachable AR system 330 of FIG. 8, is powered on. The process 600 obtains and analyzes head motion and position data, step 604, from sensors 382. Based on the sensed data, an end of lap detection decision 606 is made. If there is a detected end of lap, the "Yes" branch of decision 606 is followed to the increment lap count 608 process where the internal lap counter is incremented by one. The process flow then returns to the get and analyze head motion data process 604. If the end of lap decision 606 is indicates that an end of lap has not occurred, then the head sensed data is used to determine if the head of the user is in a first position (orientation). Decision process 620 flows to display info #1 process 622 when the decision process 620 determines "Yes" that the head is in position #1. This process 622 displays a first set of data and information to the user. The process then proceeds to the get and analyze head motion data 604 process. When decision process 620 determines that the head of the user is not in position #1, then the process 600 proceeds to process 630 and displays display info #2 to the user. The process 600 then proceeds to the obtain and analyze head motion data 604 process. In this way, predetermined and programmed information and data is displayed to the user depending on the motion of the user. The process continues until the electrical power is turned off or an interrupt signal is received. When an interrupt signal is received, for example, via WiFi chip transceiver 390, or optional wireless communication transponder 92, process control 600 process flow is transferred to received signal interrupt notification process 640. Process control is then passed to display info #3 process 642 to display yet a third collection of information and data to the user.

In one embodiment, display info #1 process 622 displays at least the current lap counter value to the user and display info #2 process 630 displays at least the rear camera view to the user. In one embodiment, display info #3 process 642 displays a message to the user that originated from external source, e.g. and email notification, or a text message. In another embodiment, signal interrupt process 640 is initiated by the user using an electronic clicker as previously described in the disclosure. In one embodiment, display info #3 process 642 displays the user's speed through the water. In another embodiment display info #3 process 642 displays an area map with the user's current location indicated on the map.

It is to be understood that the displayed information and data is illustrative only and not intended to be an exhaustive list of the information and data to be displayed for each display info process 522, 530, 622, 630, and 642.

Figure 11:
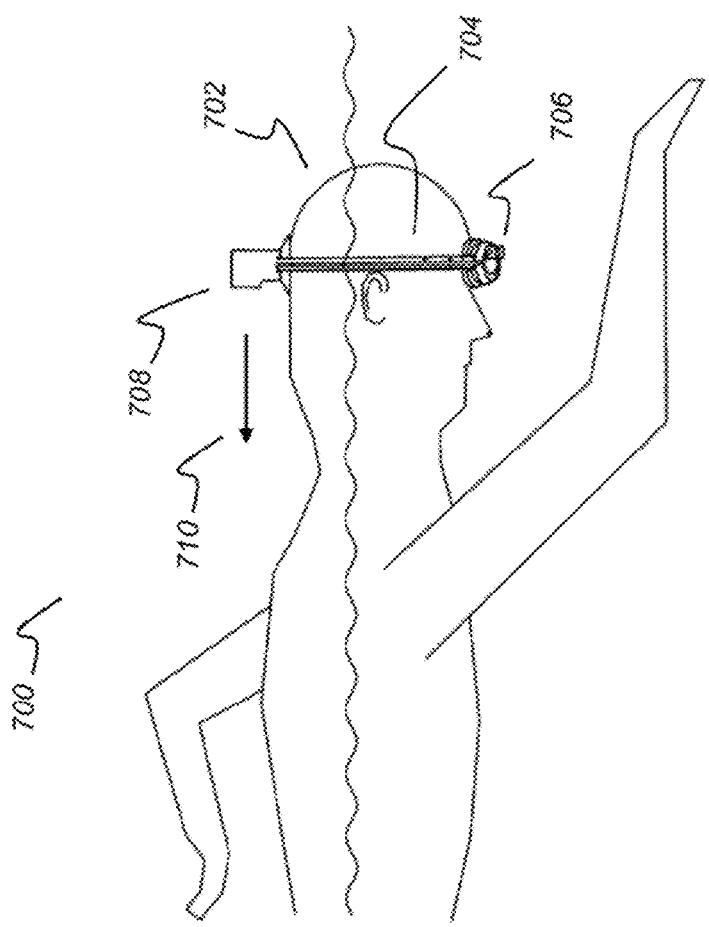
FIG. 11 shows a swimmer wearing AR goggles that have a rear-view camera.

FIG. 11 illustrates usage of the disclosed invention in a swim environment 700. In the embodiment shown, swimmer 702 wears a goggle 704 having an AR display system 706 attached to the goggles 704. Additionally, a rear facing camera system 708 is attached to the swimmer 702 and goggle 704 and in communication with AR display system 706. The rear facing camera system 708 is positioned such that it is directed substantially in the rear direction of swimmer's direction, the rear direction 710 of the swimmer. In one embodiment, rear facing camera system comprises a camera attached to a camera actuator to adjust the direction of the camera with respect to the horizontal plane and the swimmer's head orientation. In one embodiment, camera's direction is manually adjusted by the swimmer. In another embodiment, camera's direction is adjusted by software control of the camera actuator.

Figure 12:
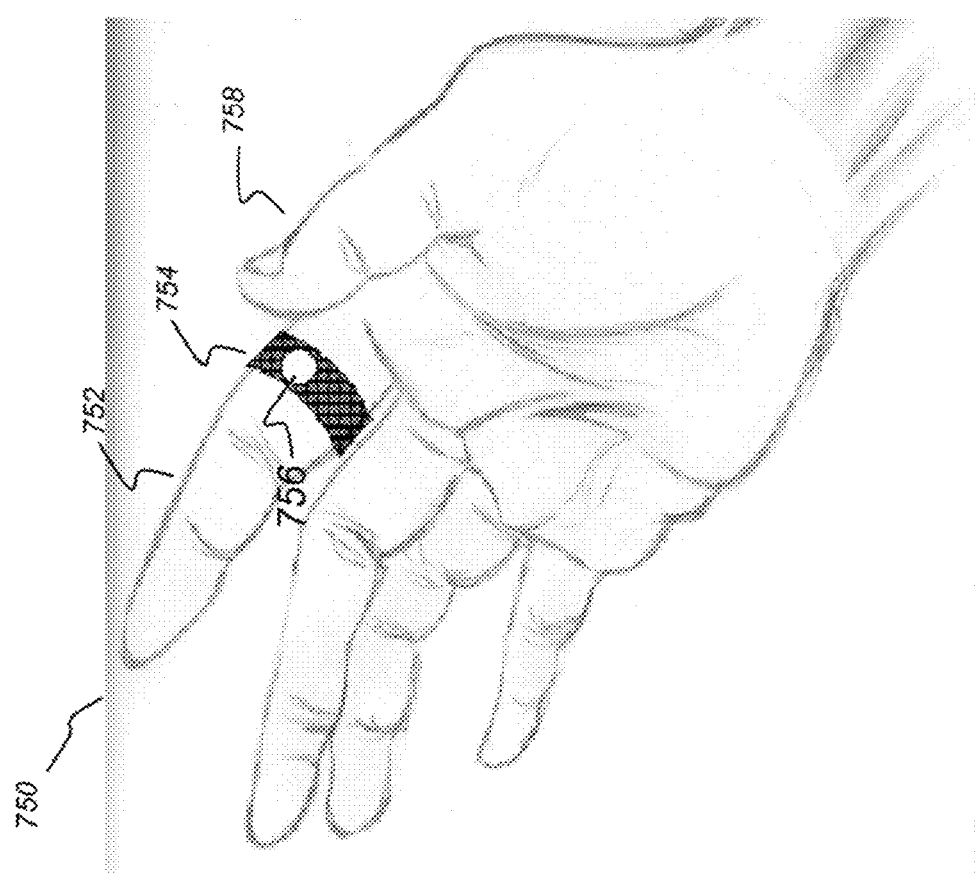
FIG. 12 shows a sketch of a swimmer's hand having a clicker signal device in the form of a ring.

FIG. 12 is a sketch of a right hand 750 comprising a right index FIG. 752 wearing a signal clicker ring system 754. Signal clicker ring system 754 has a clicker button 756 that activates the transmission of a signal whenever the clicker button 756 is pressed and released with, for example, the right thumb 758. This may be used to transmit an interrupt signal to the to the AR system of FIG. 8, to initial the change of the displayed data to the user as disclosed in FIG. 10.

Figure 14:
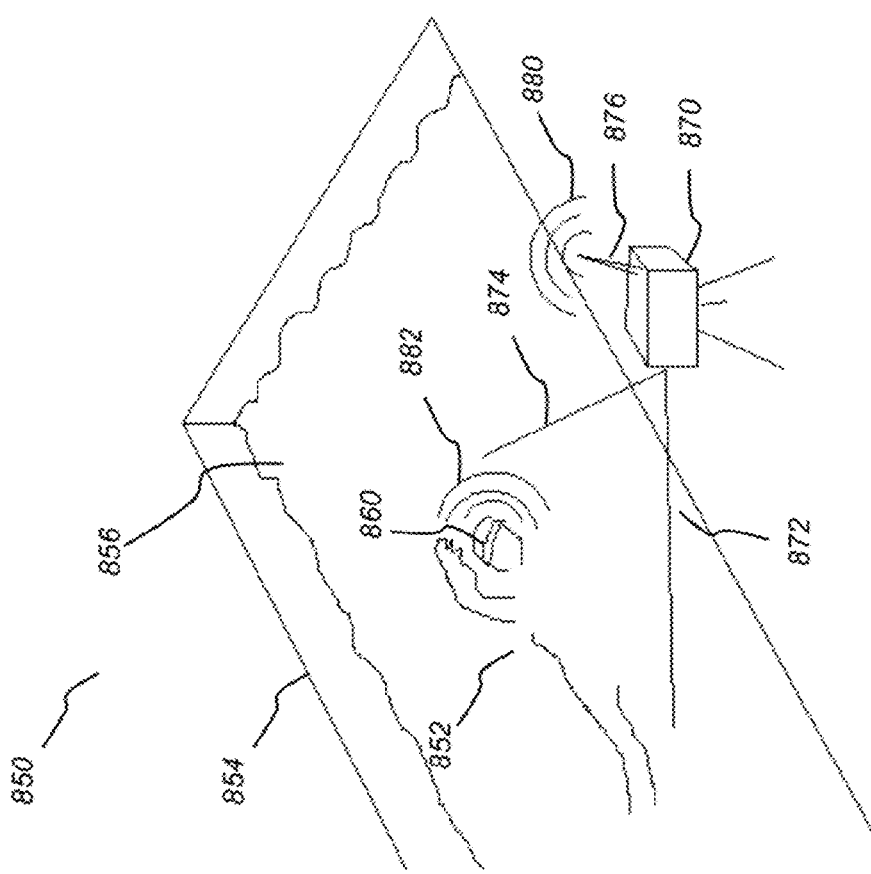
FIG. 14 shows a swimmer in a pool wearing AR swim goggles of this disclosure in communication with a camera system setup near a pool.

FIG. 14 depicts a scenario 850 in which the swimmer 852 is swimming in a pool 854 of water 856. Swimmer 852 wear's an AR swim goggle system 860. Set up near the edge of the pool 854, is a monitoring station 870. In one embodiment, monitoring station 870 captures images of the swimmer swimming within field of view 872, 874. Monitoring station 870 has a transceiver for transmitting the captured images by electromagnetic signals 880. In one embodiment, the electromagnetic signals 880 are received by AR swim goggle system 860 for display to the swimmer 852. In this way, the swimmer 852 may receive images of the swimmer swimming. In one embodiment, AR swim goggle system 860 transmit data to the monitoring station 870 via electromagnetic signals 882 where the data is then stored in the monitoring system 870 for later retrieval. In another embodiment, monitoring station 870 comprises a computational system, computer memory, and software capable of processing captured images of the swimmer and analyzing the swimmer's motion. In this way, the swimmer may receive training tips from the monitoring station with respect to the swimmer's motion. In another embodiment, the monitoring station analyzes the position of the swimmer within the pool 854 and transmits swimmer position data to the AR swim goggle system 860 for display to the swimmer. In one embodiment, monitoring station 870 comprises a cell phone cradle enabling communication from cellphone to swimmer, e.g. notification of text messages, emails, phone calls to the swimmer. In another embodiment, monitoring station 870 comprises a Blu-ray and/or DVD player enabling display of Blu-ray or DVD disk content to the swimmer. In another embodiment, monitoring station 870 comprises an internet connection and media player software enabling the display of downloaded or streaming media contents to be displayed to the swimmer, including audio content.

Imaging Aspects

FIGS. 13A-13E depict an example of a displayed rear scene image 800 that is generated using the captured image of the rear-view camera and image processing that modifies and adds additional data to the image. In FIG. 13A, the displayed rear scene image comprises a rear image 802 having a horizontal horizon line 804 and a generated head orientation line 806. As depicted in FIG. 13B, when the user's head is tilted, indicated by the tilted dashed line 806 of FIG. 13B, the image 802 is tilted as well. With the image processing, the head may be tilted but the image is rotated and shifted to compensate for the head tilt. As shown in FIG. 13C, this keeps the image 802 horizontal while the head is tilted as indicated by dashed line 806. In a similar way, when the head is tilted in the opposite direction, FIG. 13D depicts the case that the image processing is turned off or is not set to compensate for the head tilt. Both the image 802 and the line indicating the head tilt 806 are tilted together in the final image displayed to the user. In FIG. 13E, the image processing compensation for head tilt is turned on and the image 802 remains horizontal to the true horizontal plane, while the head tilt indication line 806 is tilted with respect to the image.

The description features particular embodiments, but it will be understood that variations and modifications can be effected within the spirit and scope of the disclosure. The embodiments are therefore considered in all respects to be illustrative and not restrictive and all changes that come within the meaning and range of equivalents thereof are intended to be embraced therein.

The invention claimed is:

1. Swimming goggles, comprising:
an eye covering having a transparent window defining a field of view, the eye covering having a seal extending from the transparent window operable to seal against a wearer's face and exclude water;
a flexible strap comprising a temple region connected to the eye covering;
a near-eye display operable to form virtual images viewable by one of the wearer's eyes, wherein the near-eye display comprises an image generator operable to generate images; and
a computational processing unit, wherein the computational processing unit is arranged in signal communication with the image generator, and the computational processing unit is operable to transmit virtual image data to the image generator;
wherein the near-eye display includes a rigid frame connected to the temple region.

2. The swimming goggles of claim 1, wherein the near-eye display is attached to the transparent window with a water-tight seal.

3. The swimming goggles of claim 2, wherein a spacer or gasket positioned between a portion of the near-eye display and the transparent window at least partially defines a water-tight sealed volume.

4. The swimming goggles of claim 1, wherein the near-eye display includes a prism.

5. The swimming goggles of claim 4, wherein the near-eye display includes a mirrored surface.

6. The swimming goggles of claim 1, further comprising one or more sensors arranged in signal communication with the computational processing unit, wherein at least one of the one or more sensors is operable to sense orientation and motion of the near-eye display, and wherein the one or more sensors include at least one of an accelerometer, a magnetometer, and a gyroscope.

7. The swimming goggles of claim 6, wherein at least one of the one or more sensors provides ranging distance data to the computational processing unit, wherein the computational processing unit is operable to generate distance information within the virtual image.

8. The swimming goggles of claim 6:
wherein the computational processing unit is operable to generate image orientation data of the virtual image based on the orientation and motion of the near-eye display detected by the one or more sensors; and
wherein the image data within the virtual image is rotated with respect to the representative orientation and motion of the wearer's head detected by the one or more sensors.

9. The swimming goggles of claim 8, wherein the orientation and motion information is a function of the orientation and motion of the wearer's head, and the image data within the virtual image is rotated in the opposite direction with respect to the orientation and motion of the wearer's head.

10. The swimming goggles of claim 8, wherein at least one of the one or more sensors comprise a camera arranged in signal communication with the computational processing unit, wherein the computational processing unit is operable to generate image orientation data within the virtual image based on image content from the camera.

11. The swimming goggles of claim 1, further comprising a global positioning system (GPS) transceiver.

12. The swimming goggles of claim 1, further comprising a wireless transceiver in communication with the computational processing unit, wherein said wireless transceiver is operable to transmit and receive data from an external source.

13. The swimming goggles of claim 1, wherein the near-eye display is selectively attachable to, and detachable from, the transparent window.

14. The swimming goggles of claim 1, wherein the rigid frame is attachable to the temple region via a first connection.

15. The swimming goggles of claim 1, wherein the rigid frame is detachable from the temple region.

16. The swimming goggles of claim 1, wherein the near-eye display includes a waveguide that directs light to an eyebox, within which the light forms the virtual image for the wearer.

17. The swimming goggles of claim 1, further comprising a heat conductor coupled with at least one of the computational processing unit and a power source, wherein the heat conductor is coupled with the transparent window, and wherein heat generated by at least one of the computational processing unit and the power source is at least partially transferred to the transparent window.

18. Swimming goggles, comprising:
an eye covering having a transparent window defining a field of view, the eye covering having a seal extending from the transparent window operable to seal against a wearer's face and exclude water;
a flexible strap comprising a temple region extending from the eye covering;
a near-eye display operable to form virtual images viewable by an eye of the wearer;
an image generator operable to generate images, wherein the image generator is arranged in signal communication with a computational processing unit operable to transmit virtual image data to the image generator; and
a rear-view camera arranged along the flexible strap and in signal communication with the computational processing unit, wherein the rear-view camera is arranged to capture image content from behind the wearer.

19. The swimming goggles of claim 18, further comprising one or more sensors operable to sense an orientation and motion of the rear-view camera.

20. The swimming goggles of claim 18, further comprising one or more front-facing sensors operable to capture biological and/or environmental data in front of the wearer.

21. The swimming goggles of claim 20, wherein the one or more front-facing sensors provide ranging information to the computational processing unit, whereby the computational processing unit is operable to generate distance information within the virtual image.

22. The swimming goggles of claim 18, wherein the near-eye display is configured to selectively display image data captured via the rear-view camera.

\* \* \* \* \*